(12) United States Patent
Keronen et al.

(10) Patent No.: US 6,304,907 B1
(45) Date of Patent: Oct. 16, 2001

(54) NETWORK RESOURCE ACCESS METHOD AND APPARATUS

(75) Inventors: Seppo Reino Keronen; Philip Keith Robertson, both of New South Wales (AU)

(73) Assignees: Canon Kabushiki Kaisha, Tokyo (JP); Canon Information Systems Research Australia Pty Ltd., North Ryde (AU)

( * ) Notice: Subject to any disclaimer, the term of this patent is extended or adjusted under 35 U.S.C. 154(b) by 0 days.

(21) Appl. No.: 09/130,320

(22) Filed: Aug. 7, 1998

(30) Foreign Application Priority Data

Aug. 8, 1997 (AU) .................................................. PO8478

(51) Int. Cl.[7] ...................................................... G06F 13/00
(52) U.S. Cl. .......................... 709/229; 709/203; 709/217
(58) Field of Search ..................................... 709/219, 218, 709/217, 225, 200, 203, 226, 227, 228, 229; 235/472.01; 345/357

(56) References Cited

U.S. PATENT DOCUMENTS

| 5,818,935 | * | 2/2000 | Maa | 380/20 |
| 5,895,462 | * | 4/1999 | Toki | 707/3 |
| 5,938,727 | * | 8/1999 | Ikda | 709/218 |
| 5,945,991 | * | 8/1999 | Britt et al. | 345/333 |
| 6,008,836 | * | 12/1999 | Bruck et al. | 348/6 |
| 6,008,838 | * | 12/1999 | Bruck et al. | 348/6 |
| 6,027,024 | * | 2/2000 | Knowles | 235/472.01 |
| 6,034,689 | * | 3/2000 | White et al. | 345/357 |
| 6,081,629 | * | 6/2000 | Browning | 382/313 |

* cited by examiner

Primary Examiner—Moustafa M. Meky
(74) Attorney, Agent, or Firm—Fitzpatrick, Cella, Harper & Scinto

(57) ABSTRACT

A remote control apparatus (10) for accessing a desired resource (13) on a network system (46) is disclosed. The network system (46) typically has a plurality of node sites of which at least one node includes the desired resource which is uniquely identifiable by a resource identifier (66). The remote control apparatus includes input means (32) for inputting the resource identifier into the remote control apparatus, storage means (30) for storing the entered resource identifier; transmission means (21,23,35) and authentication means (28). The transmission means provides for wireless transmission of the resource identifier to an output arrangement (11) to enable the output arrangement to receive the resource identifier and thereby access the desired resource at the network system node identified by the resource identifier for reproduction of the desired resource by the output arrangement. The authentication means provides for verifying that a user of remote control apparatus is a predetermined user thereof and for enabling or disabling the operation of the remote control apparatus accordingly.

18 Claims, 9 Drawing Sheets

NETWORK RESOURCE ACCESS METHOD AND APPARATUS

FIELD OF THE INVENTION

The present invention relates to accessing digital network resources and, in particular, to a method and apparatus for convenient access of digital networks.

BACKGROUND ART

Digital information, communication and computational resources on computer networks are assigned unique identifiers that enable network access computer terminals hereinafter access terminals) to locate and provide access to these resources. These identifiers typically consist of lengthy strings of alphanumeric characters usually referred to as Universal Resource Identifiers (URI). An example of a Universal Resource Identifier is the URL (Uniform Resource Locater) or URN (Uniform Resource Name) and derived identifiers used to individuate Internet, Intranct and similar network resources.

The resources generally comprise electronic documents, but may include services like on-line shopping facilities, order forms, Internet commerce, information retrieval and other resources available on the World Wide Web (WWW). The electronic documents generally include HyperText Markup Language (HTML) documents with hyperlinks to other HTML documents. These hyperlinks can link predetermined pages of a document at one network node site or can traverse network node sites to link pages of different documents, each of the different documents being at a different node site. Typically, the hyperlink of a page of a document at one node site that references (links) to a pace at another node site comprises a URI which identifies the other node site and, in particular, identifies the page at the other node site.

Normally a resource referred to by a Universal Resource identifier is located on a nctwork node, other than the terminal node making the access. However, resources located in local area networks can also be accessed with such URIs. If all accesses are local, the network itself is not required and some, if not all, of the above mentioned resources can be located on a stand alone computer.

With the Internet and the WWW, as an example, a user has access to a multitude of information from around the globe. The user may contribute to the pool of information by providing a "home page", being an electronic document at the user node in the network. The type of information, or more generally resource, that can be provided by the user is restricted only to the available memory of the network node and the imagination of the user. In particular, a user can store a presentation at a predetermined node site (preferably the users home site). This may include a set of images and corresponding text for a seminar presentation, and permitting access to that information from anywhere in the world where access to the Internet is possible.

Generally, where access to a telephone network is possible, a user need only have access to a computer, modem and a browser application software to gain access to the resource store at the predetermined site. Consequently, a mode of presentation becoming increasingly popular is to store a presentation at a predetermined site and to thereafter access the site to deliver the presentation, preferably on a projection display, to an audience. It is a common feature, in this day and age, that most places of business have computers and access to the Internet and sometimes can provide projection displays for the purpose of presentations or seminars.

However current methods and devices for providing access to network resources require typically entering the network identifier using a keyboard, mouse or other similar devices connected directly to the access terminal, storage of the network identifier on the access terminal device by prior use or arrangement, and then selecting the desired identifier using a keyboard or pointing device.

Disadvantages with the current methods and devices include a lack of flexibility, convenience and a general lack economy in providing access to a predetermined resource. For instance, a user wanting to present a seminar to an audience using the Internet resources described above would be seated at a computer terminal to enter the URIs and to select the various hyperlinks necessary to present the seminar. Sitting at a terminal and giving a presentation reduces the interactive nature of the presentation and stifles the style of the presentation. Alternately, another person can sit at the terminal selecting the various URIs and hyperlinks on behalf of the presenter while the presenter presents the seminar. Unfortunately this requires someone who is familiar with the presentation or is directed by the presenter as to which hyperlink to follow during the presentation. To say the least, this alternate option requires two people to present a seminar that could otherwise be presented by one if the presenter had better control in changing the displayed material.

Thus there exists a need to provide a method and apparatus which allows the presenter flexibility and control over the displayed information without the need to stifle the presentation by restricting the manner in which the presenter can change the displayed information.

SUMMARY OF THE INVENTION

In accordance with a first aspect of the present invention there is provided a remote control apparatus for accessing a desired resource on a network system, the network system having a plurality of node sites of which at least one said node site includes the resource, the resource being uniquely identifiable by a resource identifier, said remote control apparatus comprising:

input means for inputting the resource identifier into the remote control apparatus;

storage means for storing the entered resource identifier;

transmission means for wireless transmission of the resource identifier to an output arrangement to enable said output arrangement to receive the resource identifier and thereby access the desired resource at the network system node identified by the resource identifier for reproduction of said desired resource by the output arrangement; and.

authentication means for verifying that a user of remote control apparatus is a predetermined user thereof and for enabling or disabling the operation of the remote control apparatus accordingly.

In accordance with a second aspect of the present invention there is provided a system for accessing a desired resource on a network system, said network system having a plurality of node sites of which at least one said node site includes the resource, the resource being uniquely identified by a resource identifier, said system comprising;

a remote control device capable of storing and transmitting the resource identifier and including authentication means for authenticating a user of said remote control device prior to transmitting the resource identifier; and an output device adapted to receive said resource identifier, access the desired resource in accordance with the resource identifier at said network system node, and to reproduce said desired resource.

In accordance with a third aspect of the present invention there is provided a method of accessing a desired resource on a network system, said network system having a plurality of node sites of which at least one said node site includes said resource, the resource being uniquely identified by a resource identifier, the method comprising the steps of:

(a) storing at least one resource identifier in storage means on a remote control device;

(b) determining an authentication of said remote control device, and, in response to a valid authentication;

(c) transmitting the resource identifier to an output device using wireless transmission, wherein said output device further performs the steps of:
   (i) receiving the transmitted resource identifier;
   (ii) accessing the desired resource at network system node identified by the resource identifier; and
   (iii) reproducing said desired resource.

BRIEF DESCRIPTION OF THE DRAWINGS

A number of embodiments of the present invention will now be described with reference to the drawings, in which.

DETAILED DESCRIPTION

Figure 1:
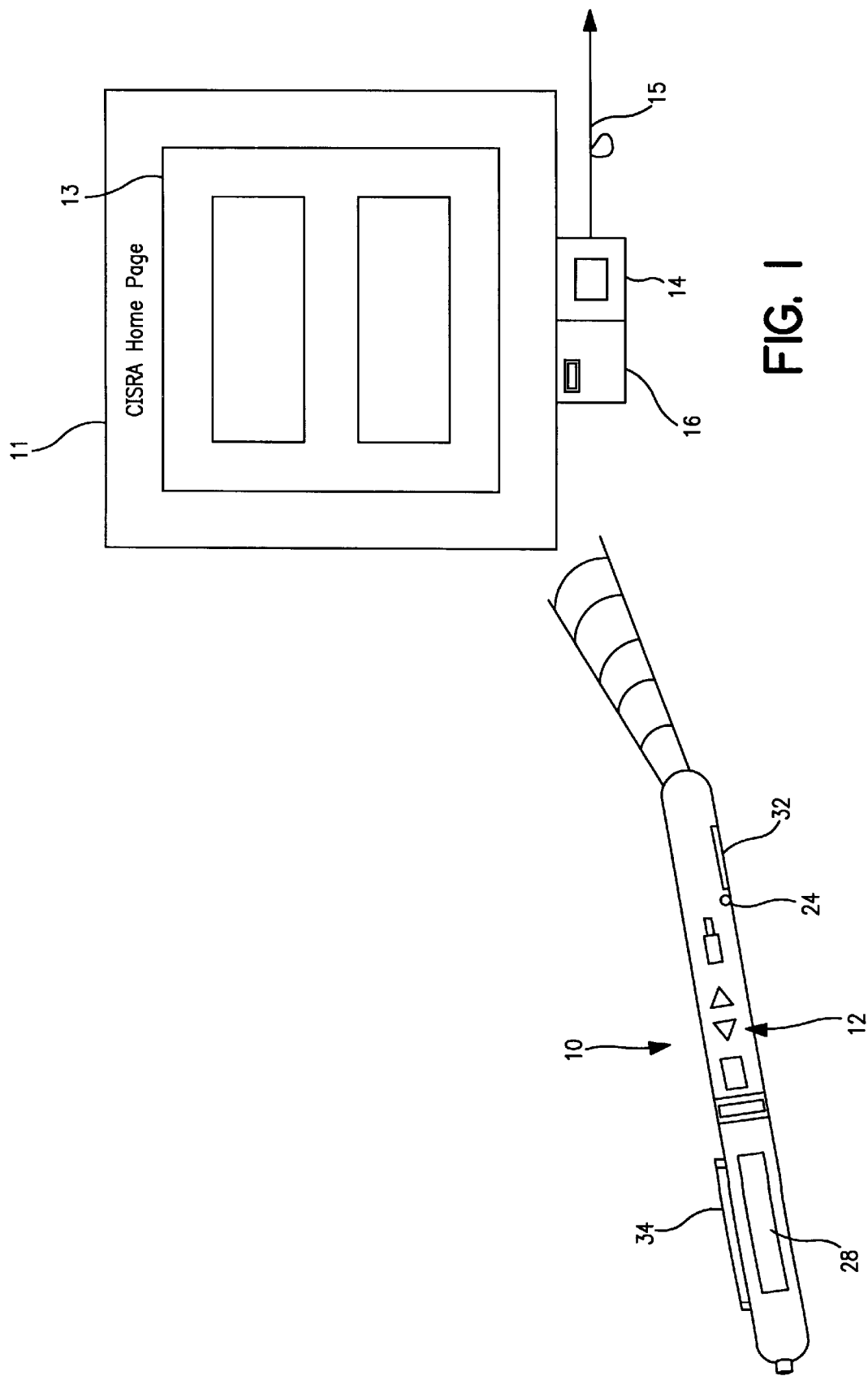
FIG. 1 illustrates an Internet pen and corresponding display access terminal apparatus in accordance with the preferred embodiment of the present invention.

Referring to FIG. 1 there is shown a remote control device 10 which is referred to herein as an Internet pen. The Internet pen 10 is a first part of the preferred embodiment of the present invention and a second part of the preferred embodiment is a corresponding display device 11 which is referred to hereinafter as a display access terminal 11. The Internet pen 10 is preferably a hand held device having a series of push button switches 12 which, through the operation of one or more of the buttons (or switches), enables the Internet pen 10 to communicate an information packet, preferably comprising at least one URI, to the display access terminal 11.

The display access terminal 11 includes a display device 13 for displaying information accessed from a network (eg. Internet), a receiver-transmitter 16 capable of receiving or transmitting the information packet from or to the Internet pen 10 respectively, a computer processing system 14 provided for accessing a network, and a communication link 15 to the network. The communication link 15 to the network (eg. the Internet) is preferably obtained via a digital telephone system, and an input/output (I/O) interface for such a communication link 15 is included in the computer processing system 14. The digital telephone system may include end-to-end digital communication line over a public telephone system such as that provided by an Integrated Service Digital Network (ISDN) connection. However, the communication link 15 can be provided through an analogue signal telephone connection, in which case a modulator/demodulator (modem) device (not illustrated in FIG. 1) is required for the communication link 15. An example of an analogue signal telephone connection is the conventional service sometimes called Plain Old Telephone Service (POTS). Other communication links are available and can be used without departing from the spirit and scope of the invention, for example a satellite link which provides access to a Internet service provider or to a telephone system can be used.

Preferably, the Internet pen 10 is a small pointing device that is conveniently held in one hand and the operation of one or more of the switches 12 causes the pen 10 to communicate one or more resource identifiers to the nearby display access terminal 11. The Internet pen 10 is provided with a directional infra-red light emitter for communication with the display access terminal 11. For example, a convenient and economical way of providing a directional beam is to recess an infra-red diode (or other emitter) within the body of the Internet pen 10 device, providing visibility of the light source from a limited range of angles. Directional communication is preferred to provide a method of selecting one particular display access terminal 11 device from a number of display access terminal devices that may be nearby. Further, the method of communication can include: visible light transmission, transmission in the radio spectrum, acoustic transmission or other forms of wireless transmission.

An advantage of the Internet pen 10 and corresponding display access terminal 11 is that a presenter can present a seminar and have control of the display access terminal 11 through the operation of the Internet pen 10. For example, to provide a presentation seminar the user stores a presentation at a predetermined node site, providing hyperlinks to any other node site that the user wishes to include in the presentation seminar. A URI (URL, URN . . . ) for the predetermined node site is stored in the Internet pen 10 as hereinafter described. The Internet pen 10, with the stored URI, is taken on location to where the seminar is to be presented to an audience. Preferably, the place where the seminar is to be held, the seminar room, is equipped with a display access terminal 11. The display access terminal 11 comprises browser application software, that cooperates with instructions provided by the information packet sent to the display access terminal 11 by the Internet pen 10, that allows the user of the Internet pen 10 to follow a predetermined URI or displayed hyperlinks to a desired page-document page. In this manner the user (presenter) can make a presentation of the seminar material to the audience.

Figure 2:
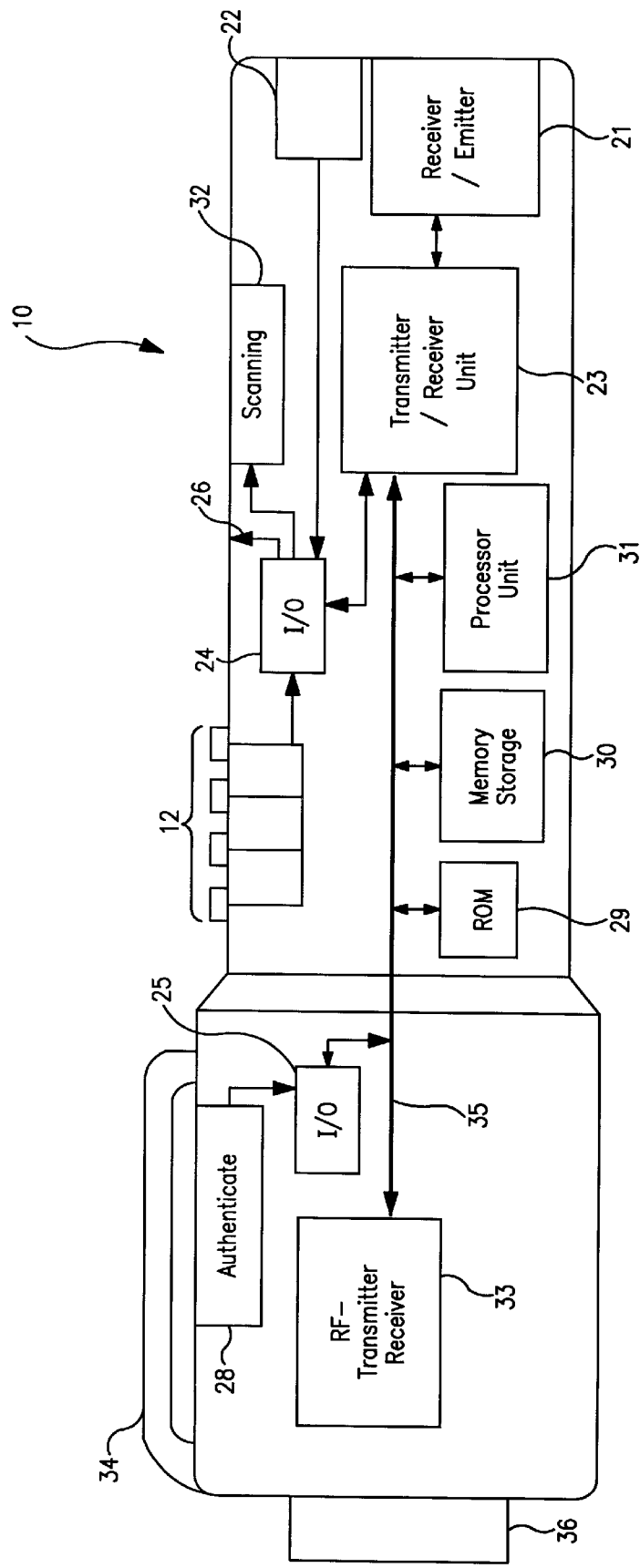
FIG. 2 is a schematic block diagram representation of the Internet pen shown in FIG. 1.

Referring to FIG. 2, the Internet pen 10 is seen to include a substantially directional receiver-emitter device 21 typically operating in the infra-red waveband, an optical transducer device 22, a transmitter-receiver unit 23, input/output interface circuitry 24, 25, an input port 26, the plurality of input buttons (or switches) 12, an authentication unit 28, Read Only Memory 29, a non-volatile read/write memory storage unit 30, a processing unit 31, and a scanning device 32, such as a barcode reader.

The directional receiver-emitter device 21 is coupled to the transmitter-receiver unit 23 to transmit and receive information packets to and from the display access terminal 11 respectively. The receiver-emitter device 21 is preferably substantially directional because it is envisaged that the Internet pen 10 be used to point to a desired display access terminal 11 and interact (communicate) with the desired terminal without interfering with another display access terminal which may be in the vicinity of the desired terminal 11.

The optical transducer device 22 is provided so that the Internet pen 10 can function as a light pen to provide freehand drawing capabilities. In this optional mode, in which the Internet pen 10 operates as a light pen, additional circuitry including a radio frequency communication arrangement 33 and a radio frequency antenna 34 are provided. The radio frequency communication arrangement 33 receives a synchronization signal from the display access device 11 providing a relationship between a scanning electron beam of a display terminal and a signal detected through the optical transducer device 22 of the Internet pen 10.

The radio frequency communications option is provided because of the proximity of the Internet pen 10 to the display terminal 11 when the pen 10 is used as a light pen to allow freehand drawing capabilities. The coordinates of the Internet pen 10 in relation to the display access terminal 11, when using the Internet pen 10 as a light pen, are transmitted via the radio frequency communication arrangement 33 to the display access terminal 11. This light pen option available to an Internet pen user through the Internet pen 10 can be enabled or disabled at will by operating a predetermined sequence of the switches 12. Other modes of wireless communication can substitute for the radio frequency communication without departing from the spirit and/or scope of the invention. For example, ultrasonic or infra-red communication can be used instead of the radio frequency transmission to perform substantially the same task. Further, the infra-red communication can be combined with the transmitter-receiver unit 23 by providing, for example, a substantially omnidirectional receiver-emitter device and corresponding receiver-emitter at the display access terminal 11 end of the communication channel capable of receiving signals from the omnidirectional receiver-emitter device when the Internet pen 10 is used as a light pen.

The transmitter-receiver unit 23 transmits or receives encoded information packets to and from the display access terminal 11 respectively using a predetermined communication protocol. Preferably, the predetermined communication protocol allows for the automatic re-transmission of an information packet if it is determined at the receiving end of the transmission that the information packet has been corrupted. The transmitter-receiver unit 23 obtains an encoded information packet from the I/O interface 24 which is connected to an internal data bus 35. An encoded information packet is constructed by the processing unit 31 using application software stored in the ROM 29 and data available from the non-volatile read/write memory storage unit 30. The non-volatile read/write memory storage 30 may comprise for example semiconductor memory such as Non-Volatile Random Access Memory (NVRAM) and the ROM 29 may be implemented by Electrically Programmable Read Only Memory (EPROM).

The Internet pen 10 of the present embodiment is preferably provided with a plurality of mechanisms for downloading (loading) to the Internet pen 10 a URI which is to be stored in the non-volatile read/write memory storage unit 30.

The mechanisms for downloading a URI include the input port 26 which can provide a direct serial or parallel connection to a general purpose computer and hence a technique for downloading one or more URIs to the pen. Also the scanning device 32, such as a barcode reader or alike, is provided to allow URIs to be scanned into the Internet pen 10. Further, the reception circuitry of the transmitter-receiver 23 can be instructed to receive from the display access terminal 11, or a dedicated transmitter unit connected to a general purpose computer, an encoded information packet comprising one or more URIs.

The authentication unit 28 provides authentication of the user operating the Internet pen 10. In particular the authentication unit 28 may include a finger print verify arrangement which can recognise the fingerprint of the user (or owner) of the Internet pen 10 and only allow operation of the Internet pen 10 if the fingerprint (eg. a thumbprint) of a desired user is recognised. An alternative is that a desired user can have access to the operation of the Internet pen 10 by entering via the plurality of buttons 12 a predetermined personal identification number (IN) or a password.

In the preferred embodiment, the authentication unit 28 provides authentication for a resource requiring identification to perform a transaction or to release information. For example, a user of the Internet pen 10 can access a resource which requires the user to be identified such as a financial transaction, banking operation, a releasing of personal or confidential information. In this case the user can be identified by the fingerprint verify arrangement and the Internet pen 10 can transmit via an information packet a corresponding verify code that allows the user to perform the transaction or release information as desired.

An additional variation on the preferred embodiment of the Internet pen 10 can include a laser diode and corresponding circuitry (not illustrated in FIG. 2) for providing a beam of light. The light beam can be used as a substitute for a pointing wand to point to various portions of a display. The combination of a light beam pointing wand, access a resource at a network site and tee capability of selecting various hyperlinks on a single Internet pen 10 can provide a convenient tool to a user presenting a seminar with the aid of a display access terminal.

Figure 3:
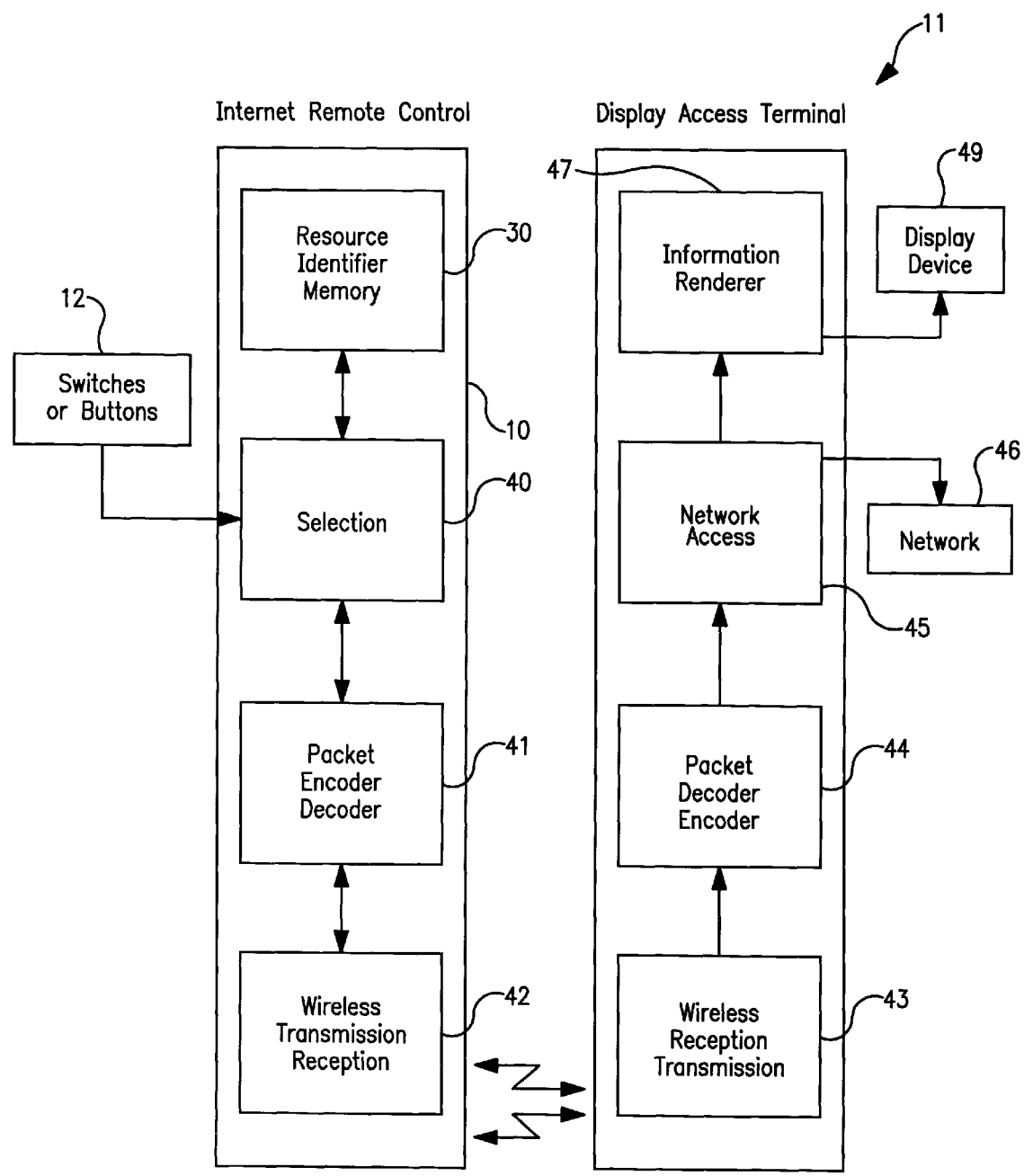
FIG. 3 is a schematic block diagram representation of transmission/reception of an information packet in accordance with an embodiment.

Referring now to FIG. 3, there is shown a block diagram representation of a transmission and/or reception of an encoded information packet in accordance with an embodiment in which the Internet pen 10 and the display access terminal 11 communicate by wireless transmission.

The steps of communicating an encoded information packet includes selecting 40 a URI, from a predetermined set of URIs that have been loaded into the memory storage unit 30, through a manipulation of the plurality of buttons 12. The selected URI is encoded 41 into an information packet to form an encoded information packet. The encoding process 41 is performed by the processing unit 31 using encoding software stored in ROM 29. The encoded information packet is transmitted 42 via wireless transmission to the display access terminal 11 by adopting a predetermined protocol for the transmission.

At the display access terminal 11 of the transmission, the encoded information packet is received 43 and decoded 44. The derived information packet, is directed to a network access step 45 where the information packet is stripped to reveal the URI substantially corresponding to the URI selected at step 40. The revealed URI is used in conjunction with a predetermined browser application program provided for computer network access on a network 46 such as the Internet or the Intranet.

As previously described, a link to the network 46 (computer network) can be provided through a digital telephone system. The browser application program locates the desired page document (resource) at the node site pointed to by the URI and upon locating the desired page, the browser application proceeds to download information of that page and passes this information to an information render step 47. The information render step 47 renders the information of the desired page onto an output display device 49. The output display device 49 is preferably a larger screen display device such as a liquid crystal display (LCD) or cathode ray tube (CRT) type display. Alternatively or additionally, the information render step 47 can be arranged to render information to various output devices including print devices, projection display devices or where the page information contains audio content information the audio content information can be rendered to an audio output device. If the browser application is not able to locate the desired page-document (resource), a predetermined message is rendered to the display device indicating to the use that the desired resource is permanently or temporarily not available.

Figure 4:
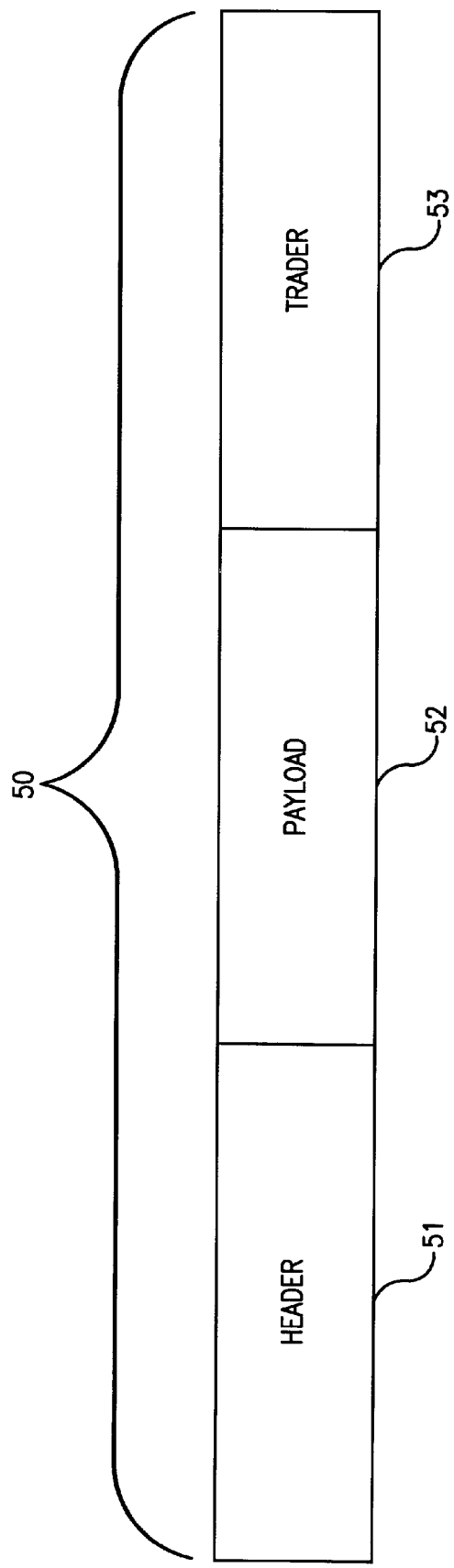
FIG. 4 is a representation of an information packet used in the transmission between the Internet pen and the corresponding display access terminal apparatus of the preferred embodiment of the present invention.

Turning to FIG. 4, there is shown a block representation of the structure of an encoded information packet 50 transmitted by the Internet pen 10 The information packet 50 comprises a header section 51 which includes receiver synchronization information, Internet pen 10 identification information for distinguishing between different Internet pens, and a payload length information. A payload section 52 is also provided to comprise one or more resource identifies (URIs). A trailer section 53 completes the packet 50 and contains information for computing a check sum for a communication protocol and includes end-of-transmission information. The information for computing a check sum is used for example to verify that the received information packet is substantially the same as the transmitted information packets at the two ends of the transmission channel.

The payload section 52 preferably includes a URI that the user of the Internet pen 10 has stored and possibly selected for transmitted to the display access terminal 11. However, the payload section 52 can optionally include relative coordinate information that enables a screen cursor to move to a desired location on a display device 11. One optional mode of the preferred embodiment is that the Internet pen 10 may function as a pointing device capable of moving a screen cursor through a manipulation of the plurality of buttons 12. For example, a user of the Internet pen 10 using the pen as a pointing device can push a first pair of the buttons 12 for up or down movement of a screen cursor, and a second pair of the buttons 12 for a left or right movement of a screen cursor. In this mode of operation, the payload section 52 comprises relative coordinates for the movement of the screen cursor. The screen cursor movement option of the Internet pen 10 can be used to point to and select various hyperlinks shown on the display access terminal 11. The selection of a hyperlink is done by pressing one of the plurality of buttons 12, in which case the payload section 52 transmitted by the Internet pen 10 includes control characters which enables the following (selection) of the hyperlink to a corresponding page-document of the Internet. Preferably, once a URI is transmitted to the display access terminal 11 and a corresponding page-document (resource) is located and displayed, the user of the Internet pen 10 can rely on the pointing device mode option to follow hyperlinks and therefore transmitting further URIs are not necessary. On the other hand, the user may desire to call a page-document (resource) whose URI is stored in the Internet pen's 10 memory storage unit 31 and cannot be directly called up from the displayed hyperlinks. In this case, the user can select the desired URI and transmit the URI as previously described.

Figure 5:
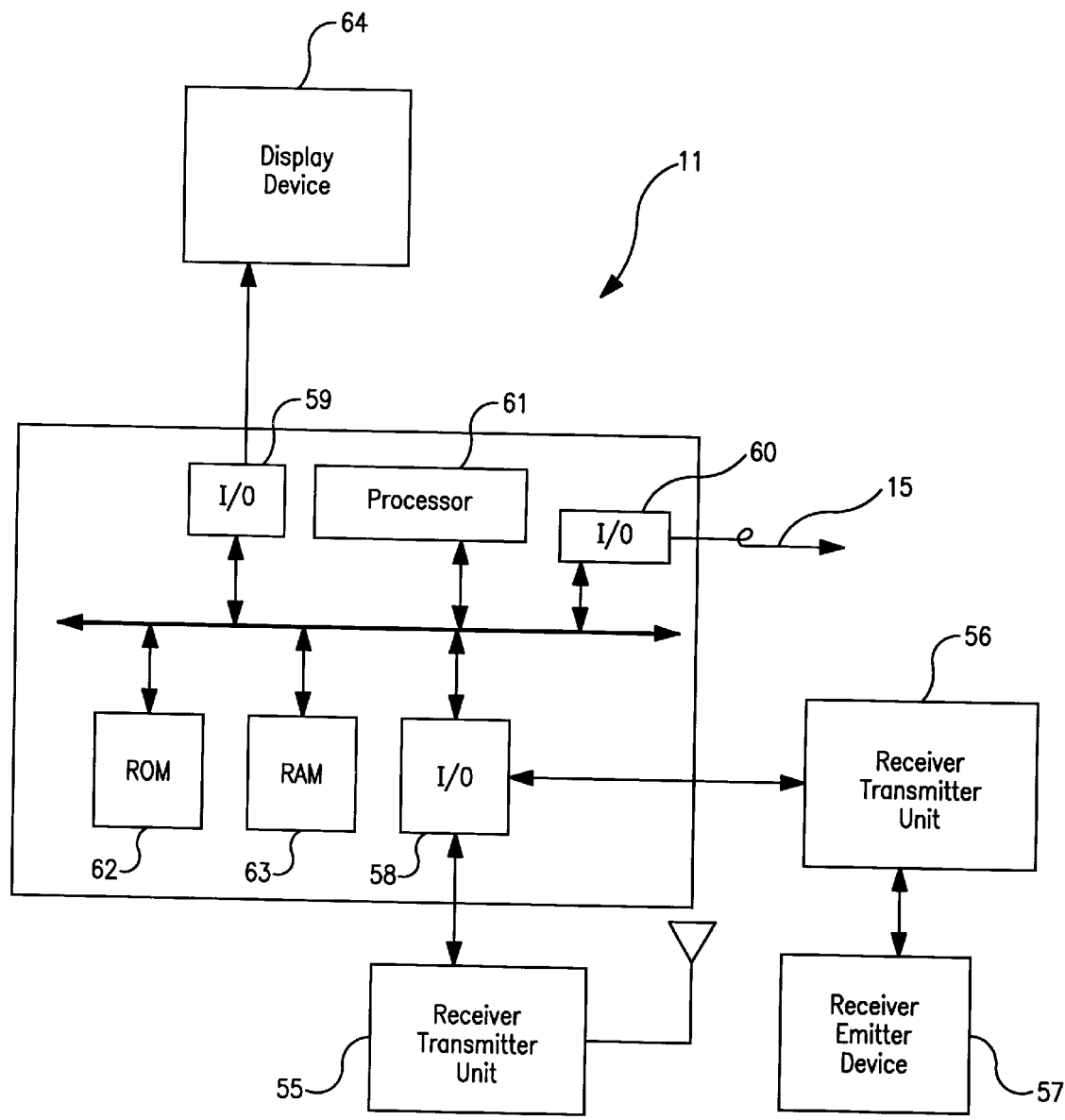
FIG. 5 is a schematic block diagram representation of the corresponding display access terminal apparatus shown in FIG. 1.

FIG. 5 is a block diagram of a display access terminal 11. The display access terminal 11 includes a radio-frequency receiver-transmitter unit 55, a receiver-transmitter unit 56 coupled preferably to a receiver-emitter device 57 for receiving or transmitting an encoded information packet 50, input/output interface (I/O) 58, 59 and 60, a processor unit 61, Read Only Memory (ROM) 62, Random Access Memory (RAM) 63, and an output display device 64. The radio-frequency (RF) receiver-transmitter unit 55 has been included for operating the Internet pen 10 as a light pen, however, operating the Internet pen 10 as a light pen is only a preferred option and the RF receiver-transmitter unit 55 can be omitted without departing from the scope or spirit of the invention.

The I/O interface 60 includes circuitry providing for a communication link 15 to be established for digital communication through the digital telephone system as hereinbefore described.

An encoded information packet, transmitted by the Internet pen 10, is received at the receiver-emitter device 57 with the aid of the receive-transmitter unit 56. The encoded information packet is communicated to the RAM 63 where preferably it is temporarily stored before processing.

The processor unit 61, with the aid of a decoding application program stored in ROM 62 or RAM 63, decodes the encoded information packet to extract predetermined information (eg. URI, screen cursor coordinate, control characters). Alternatively, the decoding and/or encoding of an information packet at either end of a transmission-reception channel can be performed by a dedicated encoding/decoding chip.

If the predetermined information is a URI, the processor unit 61 invokes a browser application to fetch corresponding resources (page-document) on the network. If the predetermined information is screen cursor coordinates, the screen cursor is manipulated according to the location dictated by the screen cursor coordinates. If the predetermined information is one or more control characters, for instance, control characters for selecting a predetermined hyperlink on a page-document, then the processor unit extracts a URI corresponding to the hyperlink and the hyperlink is followed (selected) to a corresponding node of the network to fetch a desired page-document. In each case where a page-document (resource) is fetched (ie. downloaded), the fetch resource is rendered to the display device 64.

The display device 64 can include an audio system with corresponding sound card technology, a print system with print rendering technology and a screen display such as a CRT, LCD etc. Rendering of a fetched resource (page-document) to the display device 64 is typically dependent on the content of information found to the page-document. That is, if the information of the page-document is audio-information, then this information is rendered to audio system, or if the information of the page-document comprises audio, video and print information, then the information can be rendered to the corresponding output systems or devices. Further, users of the Internet pen 10 can be given predetermined options to which output systems or devices are preferred.

Figure 6:
FIG. 6 is an example of a network resource page-document.

Turning now to FIG. 6, there is shown an example of a page-document comprising a plurality of hyperlinks 66. The hyperlinks 66 are denoted, in this example, by underlined text. Following (selecting) a hyperlink to a corresponding page-document (resource) entails selecting a desired hyperlink by moving a screen cursor 67 to the desired hyperlink and selecting that hyperlink as previously described. The corresponding page-document is then rendered to a CRT display device 68.

Once viewing or interacting with the network resource is completed, several options are possible for terminating the access:

An explicit terminate, being one of the plurality of buttons 12, is provided on the Internet pen 10. Operation of the button results in a terminate-request packet being sent to the display access terminal 11.

A heartbeat or periodic transmission of continue-request information packets is transmitted by the Internet pen 10. An absence of the heartbeat causes termination.

A power on/off switch 36 (see FIG. 2) is provided on the Internet pen 10. The power on position enables operation of the Internet pen 10, the power off position of the switch terminates any access by causing a terminate-request packet transmission. The switch 36 is preferably a push button switch. In this fashion, the Internet pen 10 is enabled for operation in much the same manner as many ball point pens.

Figure 7:
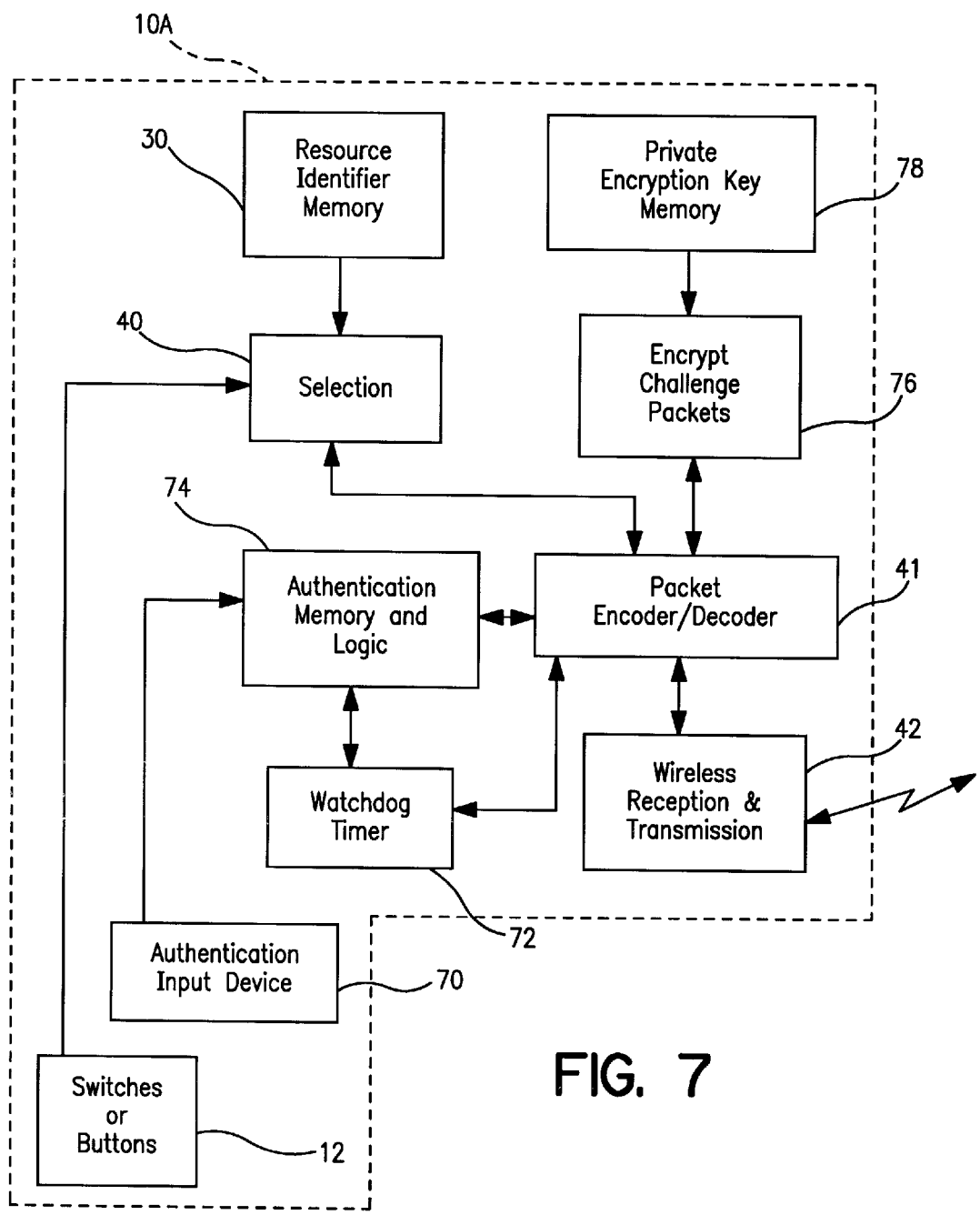
FIG. 7 is a representation similar to FIG. 3 but of the preferred embodiment.

Turning now to FIG. 7, a schematic representation of an Internet pen 10A similar to that of FIG. 3 is shown but which incorporates features of the preferred embodiment regarding authentication as mentioned previously. As before, the Internet pen 10A includes a resource identification memory 30, selection unit 40, switches or buttons 12, a packet encoder/decoder 41 and a wireless reception and transmission unit 42 corresponding to the arrangement previously described in FIG. 3 and to which corresponding description also applies.

In this specific embodiment, the Internet pen 10A is provided with an authentication and memory and logic circuit 74 which is provided with an input from an authentication input device 70. The device 70 can be any one of a number of known arrangements for providing authentication input, these including keypads into which a personal identification number (PIN) can be inserted or a fingerprint scanning device such as known in the art. In this fashion, the input device 70 outputs a signal to the authentication memory and logic circuit 74 which may be interpreted to authenticate the identity of the user of the Internet pen 10A. The logic circuit 74, having determined an authorised identity, enables operation of the packet encoder/decoder 41 to transmit and receive information via the wireless reception and transmission circuit 42. Also included is a watchdog timer 72 which connects to both of the logic circuits 74 and encoder/decoder 41 and which operates to maintain enablement of the Internet pen 10A for a predetermined period of time after a valid user authentication has taken place. The Internet pen 10A also include a private encryption key memory 78 and an encryption device 76 which allow for encrypting information to be transmitted from the Internet pen 10A to allow for secure communication with service accessible via the display access terminal 11. The service can include an Internet website, an electronic banking facility or an electronic shopping facility for example although many others will be apparent to those skilled in the art. The operation of the Internet pen 10A, in addition to the functions previously described with reference to the Internet pen 10, is characterised by two distinct functions. The first being the authentication of the person using the Internet pen 10A and the second being performance of secure communications, typically known in the art as e-commerce ("electronic commerce").

Figure 8:
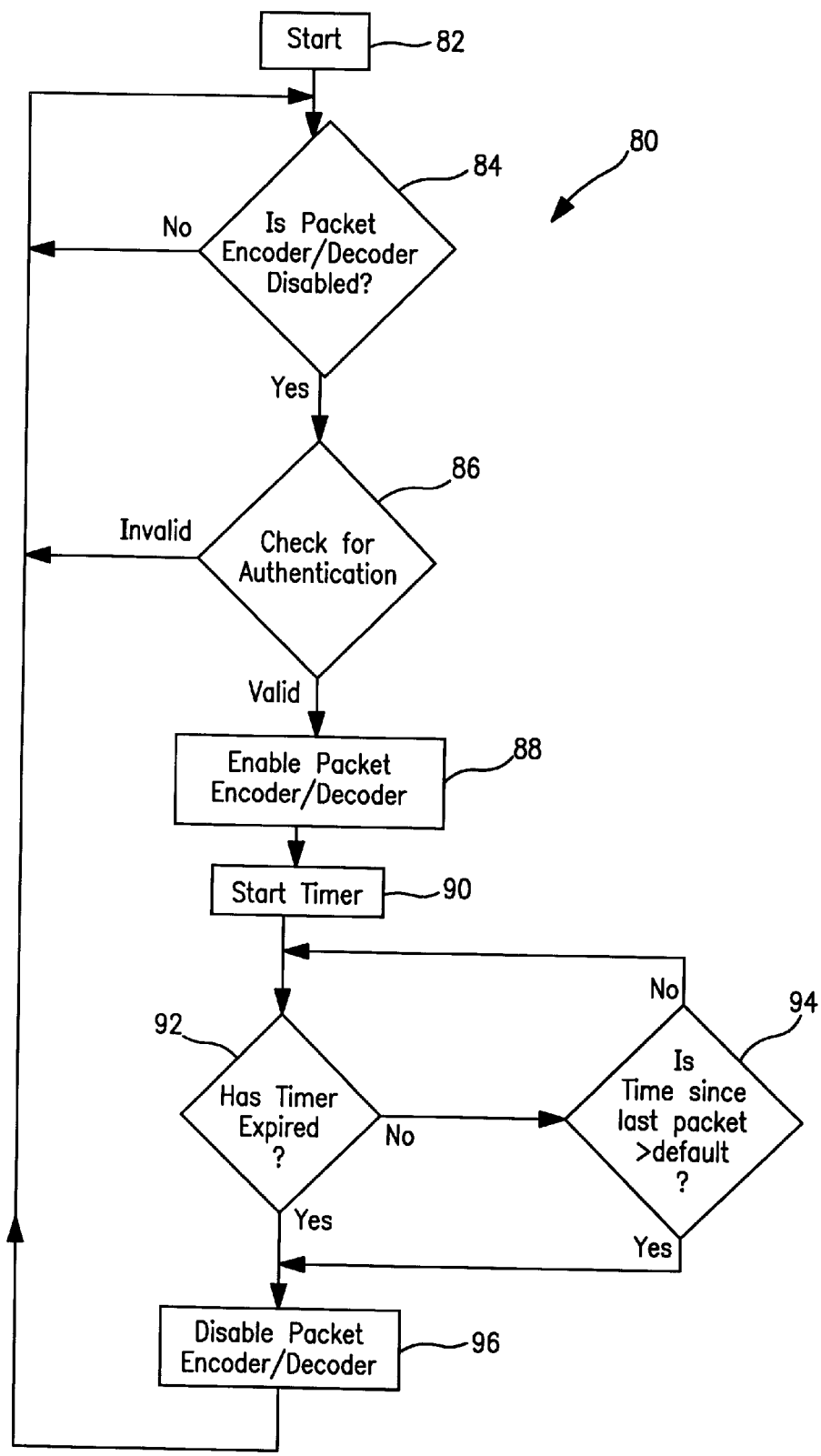
FIGS. 8 and 9 are flow charts depicting operation of the arrangement of FIG. 7.

With reference to FIG. 8, a method 80 of authenticating the use of the Internet pen 10A is shown which starts at step 82. Method steps 80 are typically implemented by computer program software operating on the processor unit 31 and interacting with the functional modules shown on FIG. 7 which of themselves may be included within the processor unit 31 or memory storage devices 29,30 as the need be and other components of the arrangement shown in FIG. 2.

At step 84, a determination is made as to whether or not the packet encoder/decoder 41 is disabled. If the encoder/decoder is disabled (no), control returns in a loop to the commencement of step 84. If the encoder/decoder is disabled (yes), control passes to step 86 which invokes a check for the authentication of the user which occurs via the authentication and memory logic circuit 74 and the authentication input device 70. This would typically involve polling the circuit hardware of the input device 70 (either a PINpad or a fingerprint scanner) and then a determination by the logic circuit 74 as to the authenticity of the user. If the user is invalid, control is returned to step 84, whereas if the user is determined to be valid, control then passes to step 88 where the packet encoder/decoder 41 is enabled for operation. At that stage, the Internet pin 10A is enabled for communication via the wireless reception and transmission circuits 42 and thereby can be actively used for the processing of information desired by the user.

When the encoder/decoder is enabled at step 88, the watchdog timer 72 is started at step 90 and operates in a fashion to control a time during which the Internet pen 10A is enabled for operation. In particular, the timer 72 is preferably operated to enable the packet encoder/decoder 41 for a predetermined period of time and this is determined at step 92 where a determination as to whether or not that time has expired is undertaken. If the time is not expired (no), control is passed to step 94 where a further check is made as to the user's activities. In particular, the method 80 maintains a watch on the time between individual transmissions of the Internet pen 10A by comparing the time between transmission/reception of the last information packet with a predetermined default time. If no transmission has occurred, and the default has been exceeded, control is passed to step 96 where the packet encoder/decoder is disabled. If the time is within the default time (no), control is returned to step 92. When the timer expires, control then also passes to step 96. Once the packet encoder/decoder is disabled, control returns to step 84 and thence to step 86 in search for further authentication of the user.

In this fashion, the method 80 enables for periodic authentication of a user of the Internet pen 10A whilst obviating a need for continual authentication as may be required and which may well be inconvenient. It will be appreciated by those skilled in the art that where fingerprint-style authentication is used, this can be conveniently performed in many cases without the specific knowledge of the user and thus may be transparent to the user's manipulation of the Internet pen 10A. Such may be advantageous where it is desired for the Internet pen 10A to include no external physical feature which specifically indicates that only authorised users may manipulate the device. Similarly, where a PINpad is used, a user would prefer not to be continually interrupted to re-enter the user's PIN and therefore the watchdog timer 72 may be set for longer default periods of time.

Figure 9:
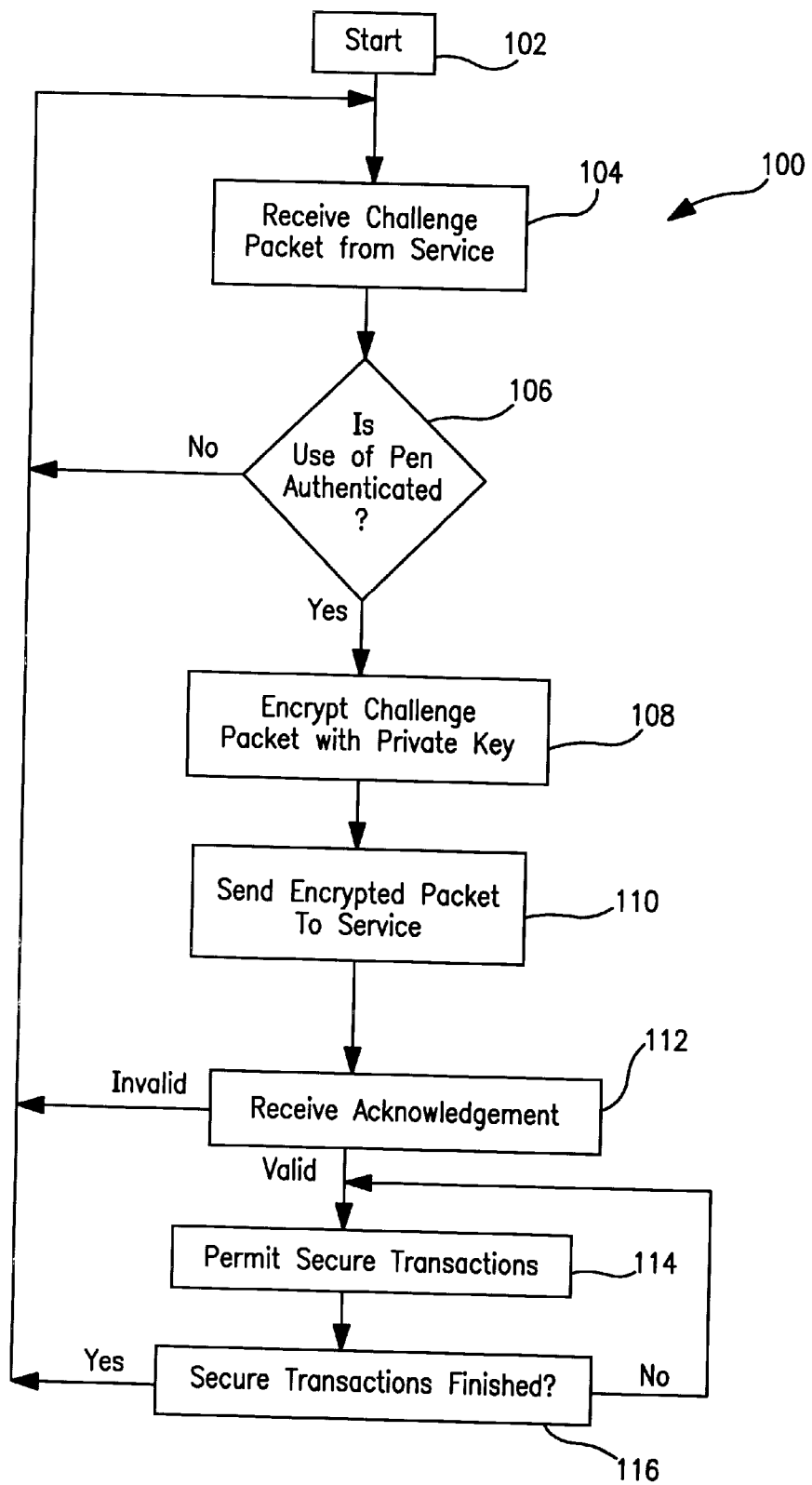

FIG. 9 illustrates a method 100 which may be implemented to permit use of the Internet pen 10A for the conduct of e-commerce.

The method 100 starts at step 102 which is followed by step 104 where the Internet pen 10A receives a challenge packet from a service to which the display access terminal 11 is electronically connected. In this connection, compared with traditional Internet-style electronic communications, secure communication such as banking and shopping and the like are invoked by the service forwarding to the user a challenge as to the user's identify whereupon it may establish the bona fides of the particular user to perform the transaction. On receipt of the challenge information packet from the service at step 104, the Internet pen 10A determines, at step 106, whether or not the use of the pen 10A has been authenticated. Step 106 is equivalent to the operation of the method 80 of FIG. 8 and if use of the pen is not authenticated, control returns to step 104. If authentication is valid (yes), control passes to step 108 where the challenge received at step 104 is communicated via the packet encoder/decoder 41 to the encryption device 76 which then encrypts the challenge packet using the private key stored within the memory 78. When the challenge packet is appropriately encrypted, at step 110, the encrypted packet is then returned to the service which performs decryption of the encrypted challenge packet using a public key to authenticate the Internet pen 10A for the performance of the requested transaction. If the encrypted challenge packet is successfully decrypted by the service, the service transmits an acknowledgment which is received at step 112 identifying either a valid or invalid transaction. If invalid, control is returned to step 104. If the key is determined to be valid, control passes to step 114 whereby secure transactions are permitted using the Internet pen 10A. This, for example, may include the transfer of monies from one bank account to another, for example as part of the purchase of goods and services and the like. At step 116, a determination is undertaken as to whether or not secure transactions are finished and if not, control is returned to step 114. If such transactions are finished, control then returns to 104.

It will be apparent from the foregoing that the Internet pen 10A, through its integral incorporation of an authentication feature, provides for convenience and ease of use of the display access terminal 11 for the performance of electronic commerce involving secure transaction and the like. Further, the ability of the Internet pen 10A to facilitate such transactions provides an advantage over traditional computing system where the user would traditionally input such information to a computer keyboard or the like. Further, where the Internet pen 10A and display access terminal 11 are used for the presentation of information to a group of persons, the authentication features can be used so that only an authorised presenter of the information can access the specific URLs desired in the presentation. In this fashion, certain URLs can be configured in a secure fashion such that only those authorised persons making the appropriate presentation can provide access to them and deliver the appropriate information to the audience.

Modifications can be made to the Internet pen 10 and display access terminal 11. Examples of modifications include application specific buttons on the Internet pen 10 analogous to a web browser application such as Netscape Navigator's (trademark of Netscape Communication Corporation) "home", "back", "forward", "bookmark", "reload", "open", "find", and "stop" icons. Further, a microphone to the Internet pen 10 and voice recognition software either stored with the pen 10 or the display access terminal may be provided for voice command operations of browsing applications software. Such may also be used for the authentication procedures described above.

The foregoing describes only a number of embodiments of the present invention, and modifications, obvious to those skilled in the art, can be made thereto without departing from the spirit and scope of the present invention.

We claim:

1. A remote control apparatus for accessing a desired resource on a network system, the network system having a plurality of node sites of which at least one said node site includes the resource, the resource being uniquely identifiable by a resource identifier, said remote control apparatus comprising:

input means for inputting the resource identifier into the remote control apparatus;

storage means for storing the entered resource identifier;

transmission means for wireless transmission of the resource identifier to an output arrangement to enable said output arrangement to receive the resource identifier and thereby access the desired resource at the network system node identified by the resource identifier for reproduction of said desired resource by the output arrangement; and authentication means for verifying that a user of the remote control apparatus is a predetermined user thereof and for enabling or disabling the operation of the remote control apparatus accordingly.

2. A remote control apparatus according to claim 1, wherein the authentication means further provides authentication of a user to a predetermined resource requiring verification.

3. A remote control apparatus according to claim 2, wherein the predetermined resource requiring verification is one of a financial transaction, electronic commerce or an authorization to release information.

4. A remote control apparatus according to claim 1, further comprising pointing means for actively pointing to, selecting or following a hyperlink, from a plurality of hyperlinks displayed on said output arrangement, to a predetermined resource.

5. A remote control apparatus according to claim 1, wherein said resource is an electronic document comprising a plurality of hyperlinks to other resources.

6. A remote control apparatus according to claim 1, wherein the transmission means provides substantially directional transmission to the output arrangement.

7. A remote control apparatus according to claim 6, wherein said directional transmission is provided to select one output device from a plurality of output devices comprising the output arrangement.

8. A remote control apparatus according to claim 1, wherein said input means comprises a barcode reader.

9. A remote control apparatus according to claim 1, wherein said remote control apparatus is a hand held device.

10. A remote control apparatus according to claim 1, wherein said storage means comprises non-volatile random access memory (NVRAM).

11. A remote control apparatus according to claim 1, wherein said input means comprises a wireless receiver adapted to receive the resource identifier for inputting to the remote control apparatus.

12. A remote control apparatus according to claim 1, wherein said output arrangement comprises at least one output device selected from a group consisting of a cathode ray tube display, a liquid crystal display, a color or monochrome printer device, an audio loud speaker and sound card combination, and a projection screen display.

13. A remote control apparatus according to claim 1, wherein said reproduction includes rendering to a display screen and wherein the remote control apparatus further includes pointing means for pointing to a predetermined portion of the rendered display screen.

14. A remote control apparatus according to claim 1, wherein said resource comprises at least one hyperlink to another resource and said remote control apparatus further comprises a selection means for following the at least one hyperlink to the another resource.

15. A system for accessing a desired resource on a network system, said network system having a plurality of node sites of which at least one said node site includes the resource, the resource being uniquely identified by a resource identifier, said system comprising:

a remote control device capable of storing the resource identifier and including authentication means for authenticating a user of said remote control device prior to a transmission of the resource identifier; and an output device adapted to receive said resource identifier transmitted by said remote control device, access the desired resource in accordance with the resource identifier at said network system node, and to reproduce said desired resource.

16. A system according to claim 15, wherein said output device includes an encryption arrangement for encrypting information to be sent to said network system node to enable secure manipulation of user requests at said network system node.

17. A method of accessing a desired resource on a network system, said network system having a plurality of node sites of which at least one said node site includes said resource, the resource being uniquely identified by a resource identifier, the method comprising the steps of:

(a) storing at least one resource identifier in storage means on a remote control device;

(b) determining an authentication of said remote control device, and, in response to a valid authentication;

(c) transmitting the resource identifier to an output device using wireless transmission, wherein said output device further performs the steps of:

(i) receiving the transmitted resource identifier;

(ii) accessing the desired resource at the network system node identified by the resource identifier; and (iii) reproducing said desired resource.

18. A method according to claim 17, wherein the step of reproducing said desired resource includes forwarding from said network system node an authentication challenge to said remote control device and said method includes the further steps of:

(d) receiving said authentication challenge at said remote control device;

(e) encrypting said authentication challenge using a private key stored within and unique to said remote control device; and (f) transmitting said encrypted authentication challenge from said remote control.

* * * * *

UNITED STATES PATENT AND TRADEMARK OFFICE
CERTIFICATE OF CORRECTION

PATENT NO. : 6,304,907 B1
DATED : October 16, 2001
INVENTOR(S) : Keronen et al.

It is certified that error appears in the above-identified patent and that said Letters Patent is hereby corrected as shown below:

<u>Title page,</u>
Item [73], Assignees: "Canon Information Systems Research Australia Pty Ltd., North Ryde (AU)" should be deleted.

<u>Drawings,</u>
Sheet 4, Fig. 4, "TRADER" should read -- TRAILER --.

<u>Column 1,</u>
Line 11, "here-" should read -- (here- --;
Line 18, "Intranct" should read -- Intranet --;
Line 31, "pace" should read -- page --; and
Line 36, "identifier" should read -- Identifier --.

<u>Column 2,</u>
Line 48, "and." should read -- and --.

<u>Column 3,</u>
Line 6, "of." should read -- of: --; and
Line 25, "invention." should read -- invention; --.

<u>Column 6,</u>
Line 3, "alike," should read -- the like, --;
Line 18, "(IN)" should read -- (PIN) --; and
Line 36, "tee" should read -- the --.

<u>Column 7,</u>
Line 36, "transmitted" should read -- transmission --.

UNITED STATES PATENT AND TRADEMARK OFFICE
CERTIFICATE OF CORRECTION

PATENT NO. : 6,304,907 B1
DATED : October 16, 2001
INVENTOR(S) : Keronen et al.

It is certified that error appears in the above-identified patent and that said Letters Patent is hereby corrected as shown below:

Column 9,
Line 48, "include" should read -- includes --.

Signed and Sealed this

Twenty-second Day of October, 2002

Attest:

Attesting Officer

JAMES E. ROGAN
Director of the United States Patent and Trademark Office